US011986940B2

(12) United States Patent
Yue et al.

(10) Patent No.: US 11,986,940 B2
(45) Date of Patent: May 21, 2024

(54) CLUTCH ASSEMBLY FOR A POWER TOOL

(71) Applicant: MILWAUKEE ELECTRIC TOOL CORPORATION, Brookfield, WI (US)

(72) Inventors: Brian J. Yue, Weston, MA (US); Hugh A. Dales, Germantown, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/875,022

(22) Filed: Jul. 27, 2022

(65) Prior Publication Data
US 2023/0031293 A1 Feb. 2, 2023

Related U.S. Application Data

(60) Provisional application No. 63/226,415, filed on Jul. 28, 2021.

(51) Int. Cl.
*B25F 5/00* (2006.01)
*F16D 43/206* (2006.01)

(52) U.S. Cl.
CPC ............ *B25F 5/001* (2013.01); *F16D 43/206* (2013.01)

(58) Field of Classification Search
CPC .............................. B25F 5/001; F16D 43/206
See application file for complete search history.

(56) References Cited

U.S. PATENT DOCUMENTS

| 4,986,369 A | 1/1991 | Fushiya et al. |
| 8,419,760 B2 | 4/2013 | Wiebe, III |
| 9,192,394 B2 | 11/2015 | Belagali |
| 10,737,373 B2 | 8/2020 | Duncan et al. |
| 2006/0291966 A1 | 12/2006 | Klemm et al. |
| 2008/0210450 A1 | 9/2008 | Spielmann et al. |
| 2013/0319707 A1 | 12/2013 | Roehm et al. |
| 2016/0206327 A1 | 7/2016 | Wiebe, III |
| 2020/0331136 A1 | 10/2020 | Duncan et al. |

FOREIGN PATENT DOCUMENTS

WO 2018204741 A1 11/2018

OTHER PUBLICATIONS

International Search Report and Written Opinion for Application No. PCT/US2022/038525 dated Nov. 17, 2022 (10 pages).

*Primary Examiner* — Daniel Jeremy Leeds
(74) *Attorney, Agent, or Firm* — Michael Best & Friedrich LLP

(57) ABSTRACT

A rotary power tool includes a housing and a drive mechanism disposed within the housing. The drive mechanism includes an electric motor, a transmission operably coupled to the electric motor, a spindle operably coupled to an output of the transmission, the spindle configured to transmit torque generated by the electric motor to a working tool bit, and a clutch disposed between the output of the transmission and the spindle. The clutch includes a plurality of spherical rolling elements configured to engage the output of the transmission, a plurality of cylindrical clutch elements, and at least one biasing member configured to bias the cylindrical clutch elements towards the spherical rolling elements. Each of the cylindrical clutch elements includes a length measured parallel to a rotational axis of the spindle and a diameter, and the diameter is greater than the length.

20 Claims, 4 Drawing Sheets

CLUTCH ASSEMBLY FOR A POWER TOOL

CROSS-REFERENCE TO RELATED APPLICATIONS

This application claims priority to U.S. Provisional Patent Application No. 63/226,415 filed on Jul. 28, 2021, the entire content of which is incorporated herein by reference.

FIELD OF THE INVENTION

The present invention relates to power tools and more particularly to clutch assemblies for rotary power tools.

BACKGROUND OF THE INVENTION

Some power tools, specifically rotary power tools, may include a clutch assembly for limiting an amount of torque transferred by the power tool to a workpiece. These tools typically include a clutch-setting selector to allow an operator to select different torque limits.

SUMMARY OF THE INVENTION

The present disclosure provides, in one aspect, a rotary power tool including a housing and a drive mechanism supported within the housing. The drive mechanism includes an electric motor and transmission, a spindle rotatable in response to receiving torque from the electric motor and transmission, and a clutch coupling the spindle to the electric motor and transmission. The clutch includes a plurality of rolling elements selectively coupled to an output of the transmission to receive torque from the transmission, a plurality of pins aligned with the plurality of rolling elements, a plurality of puck shaped clutch elements aligned with the pins and rolling elements, and at least one biasing member configured to bias the clutch elements towards the pins and rolling elements. The plurality of rolling elements are configured to slip relative to the output of the transmission when torque from the transmission exceeds a preselected torque limit.

The present disclosure provides, in another aspect, a rotary power tool including a housing and a drive mechanism disposed within the housing. The drive mechanism includes an electric motor, a transmission operably coupled to the electric motor, a spindle operably coupled to an output of the transmission, the spindle configured to transmit torque generated by the electric motor to a working tool bit, and a clutch disposed between the output of the transmission and the spindle. The clutch includes a plurality of spherical rolling elements configured to engage the output of the transmission, a plurality of cylindrical clutch elements, and at least one biasing member configured to bias the cylindrical clutch elements towards the spherical rolling elements. Each of the cylindrical clutch elements includes a length measured parallel to a rotational axis of the spindle and a diameter, and the diameter is greater than the length.

The present disclosure provides, in yet another aspect, a rotary power tool including a housing and a drive mechanism disposed within the housing. The drive mechanism includes an electric motor, a transmission operably coupled to the electric motor, a spindle operably coupled to an output of the transmission, the spindle configured to transmit torque generated by the electric motor to a working tool bit, and a clutch disposed between the output of the transmission and the spindle and configured to selectively transfer torque from the output of the transmission to the spindle. The clutch includes a plurality of spherical rolling elements configured to engage the output of the transmission. The plurality of spherical rolling elements are configured to slop relative to the output of the transmission when the torque from the transmission exceeds a selected torque limit. The clutch further includes a plurality of puck shaped clutch elements configured to be selectively aligned with the plurality of spherical rolling elements. The puck shaped clutch elements being larger in diameter than length. At least one biasing member is configured to bias the plurality of puck shaped clutch elements towards the spherical rolling elements. The clutch further includes an adjustment mechanism configured to vary the selected torque limit, and a lockout ring rotatable between a clutch configuration, in which the clutch is operable to limit the torque transferred from the output of the transmission to the spindle, and a lock out configuration, in which the clutch does not limit the torque transferred to the spindle.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
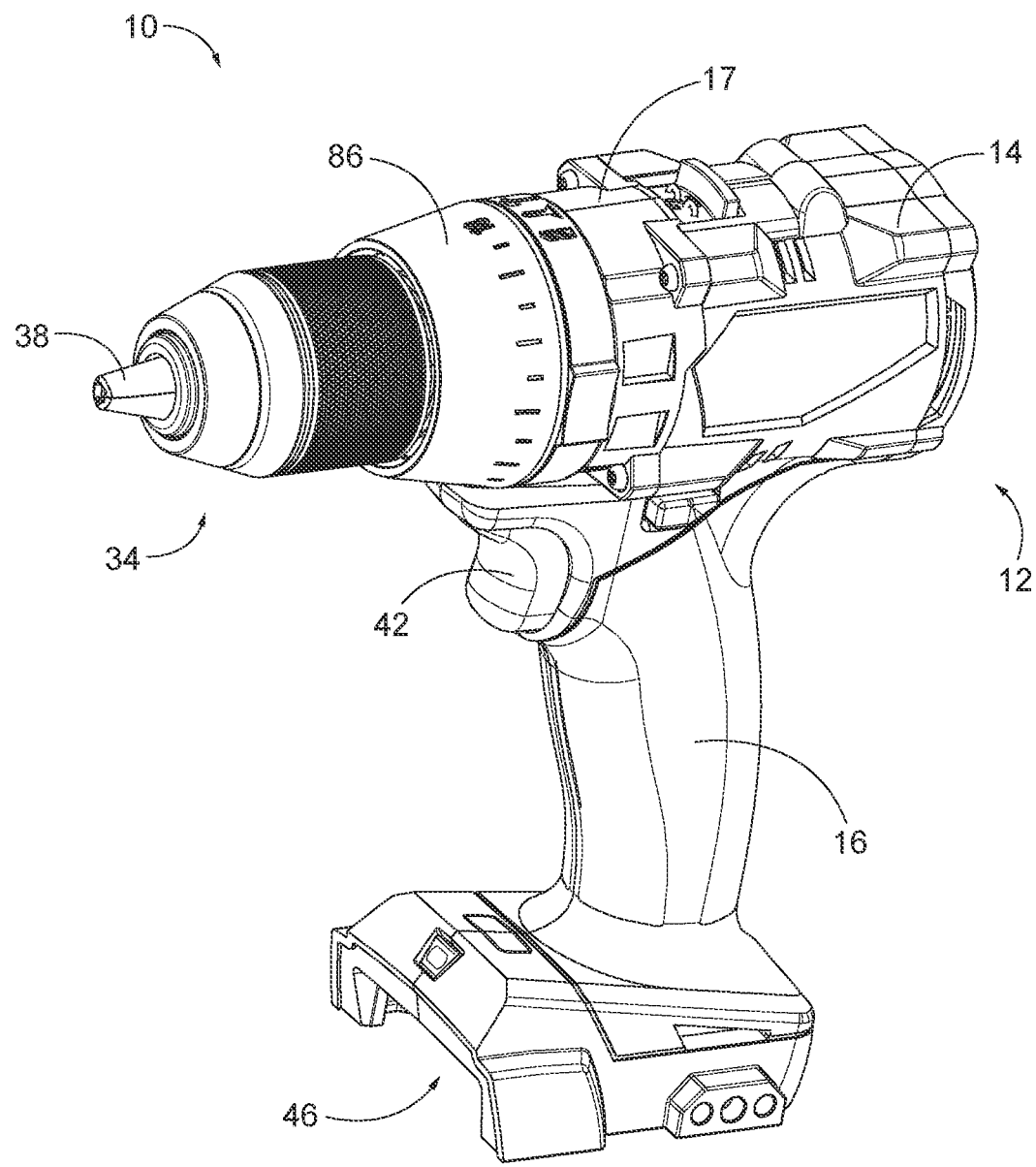
FIG. 1 is a perspective view of a rotary power tool including a clutch assembly according to an embodiment of the present disclosure.
Figure 2:
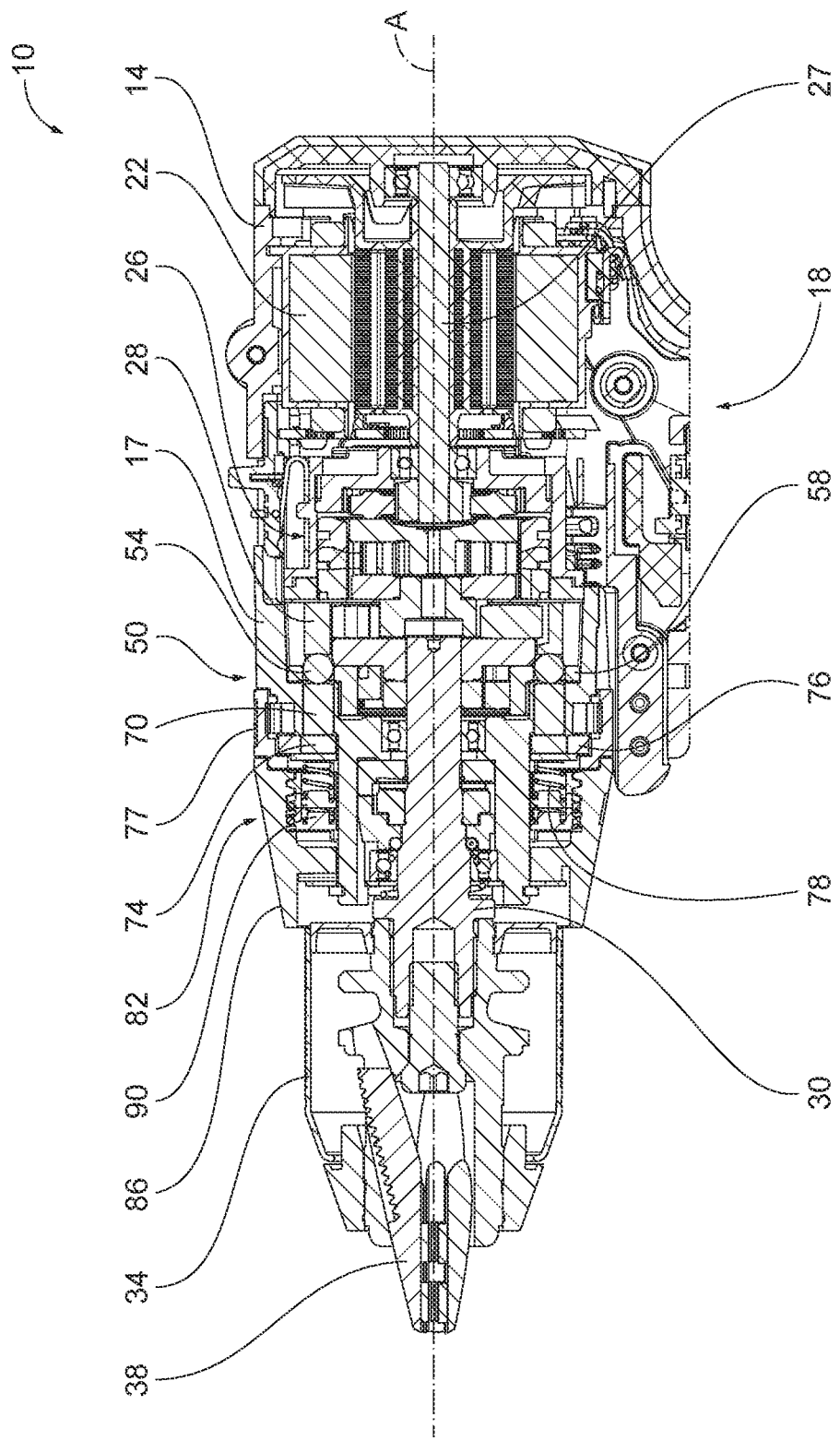
FIG. 2 is an enlarged cross-sectional view of the rotary power tool of FIG. 1.

FIG. 1 illustrates a rotary power tool 10 in the form of a drill. The power tool 10 includes a housing 12 having a motor housing portion 14, a handle portion 16 extending from the motor housing portion 14, and a front housing portion or gear case 17 coupled to a front side of the motor housing portion 14. With reference to FIG. 2, a drive mechanism 18 is disposed within the housing 12 and includes an electric motor 22 supported within the motor housing portion 14 and a transmission 26 coupled to an output shaft 27 of the electric motor 22 and supported at least partially within the gear case 17. In the illustrated embodiment, the transmission 26 is a multi-speed planetary transmission, which is shiftable to provide the power tool 10 with different output speeds. In other embodiments, other types of transmissions may be used.

With continued reference to FIG. 2, an output 28 of the transmission 26 (e.g., a last stage carrier or last stage ring gear of the multi-speed planetary transmission) is operatively coupled to a spindle 30 of the power tool 10 such that the electric motor 22 may drive the spindle 30 via the transmission 26 to rotate the spindle 30 about an axis A. In the illustrated embodiment, the rotational axis A of the spindle 30 is coaxial with the motor output shaft 27; however, the motor output shaft 27 may be oriented parallel or perpendicular to the rotational axis A of the spindle 30 in other embodiments.

The illustrated drive mechanism 18 further includes a chuck 34 located at an end of the spindle 30 opposite the transmission 26 and coupled for co-rotation with the spindle 30. The chuck 34 includes a plurality of jaws 38 configured to support a working tool bit (e.g., a drill bit, screwdriver bit, or the like; not shown). Torque is transmitted from the electric motor 22 through the transmission 26 and spindle 30 to the chuck 34 to be imparted on a workpiece. The electric motor 22 is operated via a trigger 42 located on the handle portion 16 (FIG. 1). Power for the electric motor 22 may be drawn from an on-board power source such as a battery (not shown) removably coupled to a battery receptacle 46 located at a bottom end of the handle portion 16 (FIG. 1). In other embodiments, the power tool 10 may be powered by a remote power source (e.g., an alternating current source) via a cord.

Figure 3:
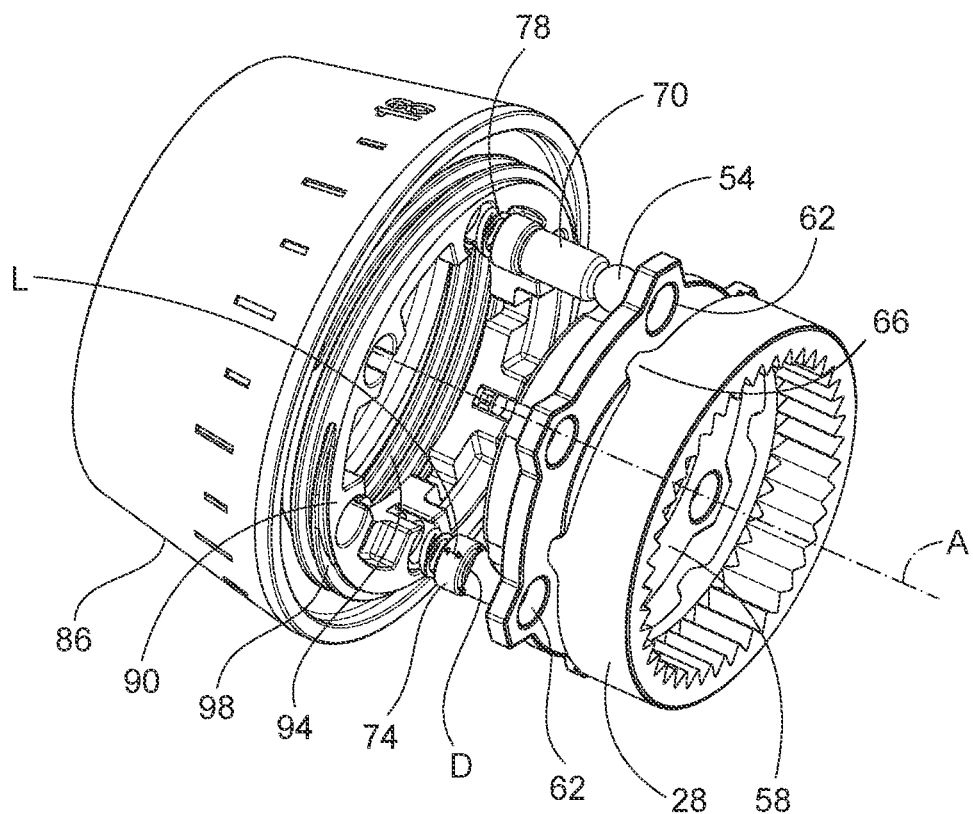
FIG. 3 is an exploded detail view of the clutch assembly of FIG. 1.

With reference to FIGS. 2-3, the spindle 30 is operatively coupled to the transmission 26 by a clutch assembly 50. The illustrated clutch assembly 50 includes a plurality of spherical rolling elements 54 supported within a cage 58 that is axially and rotationally affixed to the spindle 30. The cage 58 surrounds a portion of the spindle 30 proximate the transmission 26. Each of the plurality of spherical rolling elements 54 is disposed within a pocket 62 of the cage 58 (FIG. 3). The cage pockets 62 are evenly spaced in a circumferential direction of the cage 58.

The rolling elements 54 engage a plurality of forwardly-extending projections or detents 66 on the output 28 of the transmission 26. That is, each of the plurality of detents 66 interacts with a rolling element 54 to transmit torque through the rolling elements 54, to the cage 58, spindle 30, and chuck 34. As described in greater detail below, the rolling elements 54 are biased into engagement with the detents 66 but are displaceable away from the detents 66, to ride over the detents 66 (or "slip") and thereby permit relative rotation between the output 28 of the transmission 26 and the downstream components of the drive mechanism 18, if torque transfer between the output 28 and the spindle 30 exceeds a selected torque limit.

In more detail, the clutch assembly 50 is configured to limit the amount of torque capable of being transmitted to the spindle 30. The illustrated clutch assembly 50 includes a plurality of pins 70 and a plurality of clutch elements 74 biased toward the rolling elements 54 by a biasing arrangement, which in the illustrated embodiment includes a plurality of biasing elements 78 (e.g., coil springs), each associated with (i.e. positioned generally in-line with) a respective one of the pins 70, clutch elements 74, and rolling elements 54 (FIGS. 2 and 3). In other embodiments, the biasing arrangement may include a single coil spring, wave spring, disc spring, or the like for biasing the clutch elements 74 and pins 70 toward the rolling elements 54 and, in turn, biasing the rolling elements 54 toward the output 28 of the transmission 26. Thus, the rolling elements 54 are biased towards the transmission output 28 to engage the detents 66.

The clutch assembly 50 further includes an adjustment mechanism 82 to allow a user to vary the upper torque limit that is transmitted by the clutch 50 prior to slipping. The illustrated adjustment mechanism 82 includes an outer collar 86 and an inner sleeve 90. The outer collar 86 is axially fixed relative to the gear case 17 and rotatable relative to the gear case 17 about the axis A. The inner sleeve 90 is rotationally fixed while being axially movable relative to the gear case 17. The outer collar 86 and inner sleeve 90 each have corresponding threads 94, 98, engaged such that rotation of the outer collar 86 results in axial motion of the inner sleeve 90. The biasing elements 78 each have one end supported by the inner sleeve 90. Therefore, rotation of the collar 86 in a first direction to move the inner sleeve 90 axially rearwards (towards the motor) compresses the biasing elements 78, thereby increasing the force applied by the biasing elements 78 onto the clutch elements 74. Likewise, rotation of the collar 86 in a second, opposite direction to move the inner sleeve 90 axially forward (away from the motor) reduces the preload on the biasing elements 78 and thereby reduces the force applied by the biasing elements 78 onto the clutch elements 74. In some embodiments, the outer collar 86 may include a detent mechanism and/or indicia to provide tactile and/or visual indications to a user of the amount of adjustment applied to the clutch assembly 50.

Figure 4:
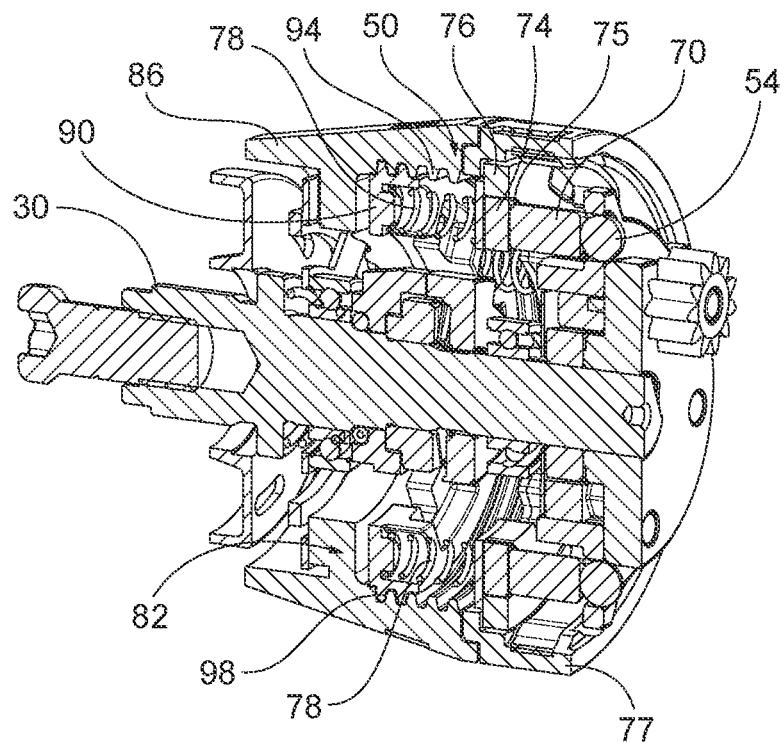
FIG. 4 is an enlarged cross-sectional view illustrating the clutch assembly of FIG. 1 in a clutch configuration.
Figure 5:
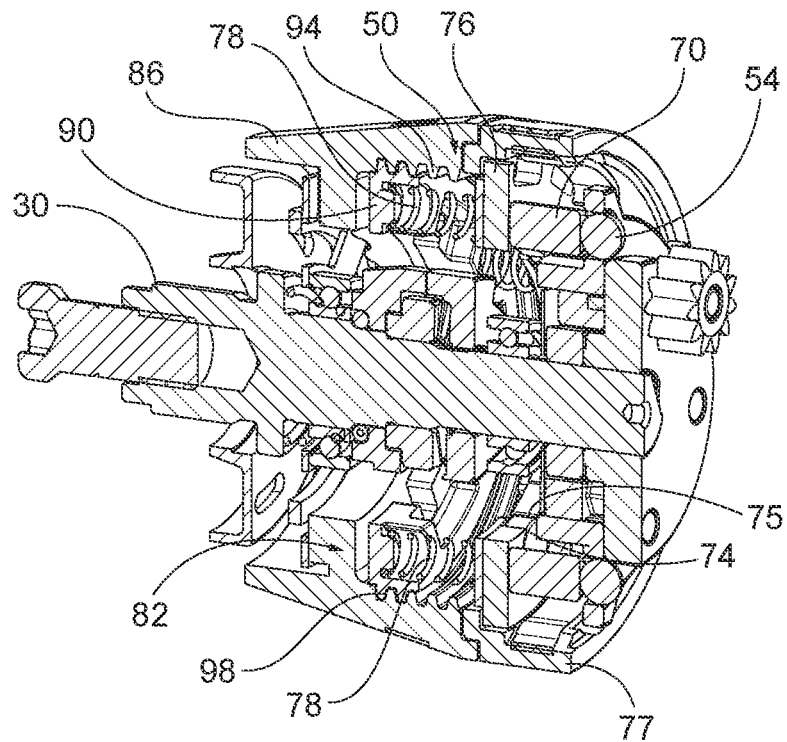
FIG. 5 is an enlarged cross-sectional view illustrating the clutch assembly of FIG. 1 in a lockout configuration.

With reference to FIGS. 4 and 5, the clutch elements 74 are accommodated within a plurality of bores 75 formed in a lockout ring 76 of the clutch assembly 50. The lock out ring 76 is rotatably coupled to the gear case 17 at a position rearward of the outer collar 86. The lock out ring 76 is rotatable between a clutch configuration, illustrated in FIG. 4, and a lockout configuration, illustrated in FIG. 5. In the clutch configuration, the bores 75 in the lockout ring 76 are axially aligned with the pins 70 and rolling elements 54, such that the clutch elements 74 can transfer the spring force from the biasing elements 78 to the rolling elements 54 and also permit axial displacement of the rolling elements 54, pins 70, and clutch elements 74 to compress the biasing elements 78 and permit slippage of the clutch assembly 50 if the torque threshold of the clutch assembly 50 is exceeded. In the lockout configuration, the lockout ring 76 is rotated such that the bores 75 are misaligned with the pins 70 and rolling elements 54. As such, the rolling elements 54 and pins 70 cannot be axially displaced away from the detents 66, and torque is always transferred between the output 28 of the transmission 26 and the spindle 30.

Referring to FIG. 3, each of the plurality of clutch elements 74 in the illustrated embodiment has a cylindrical shape, with a length L extending parallel to the axis A, and opposite flat sides defining a diameter D. In the illustrated embodiment, the length L of the clutch elements 74 is less than the diameter D. Thus, the cylindrical shape of the clutch elements 74 requires less axial space to accommodate the clutch elements 74, as compared to a spherical shape having the same diameter D. This advantageously allows the overall length of the clutch assembly 50 to be reduced.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. A rotary power tool comprising:
    a housing; and
    a drive mechanism supported within the housing, the drive mechanism including
        an electric motor and a transmission,
        a spindle rotatable in response to receiving torque from the electric motor and the transmission, and
        a clutch coupling the spindle to the electric motor and transmission, the clutch including a plurality of rolling elements selectively coupled to an output of the transmission to receive torque from the transmission,
a plurality of pins aligned with the plurality of rolling elements,
a plurality of puck shaped clutch elements aligned with the pins and rolling elements, and
at least one biasing member configured to bias the clutch elements towards the pins and rolling elements,
wherein the plurality of rolling elements is configured to slip relative to the output of the transmission when torque from the transmission exceeds a pre-selected torque limit.

2. The rotary power tool of claim 1, wherein the clutch includes a rotatable collar coupled to the housing, the rotatable collar configured to adjust a force applied by the at least one biasing member to the plurality of clutch elements, and wherein increasing the force applied by the at least one biasing member increases the pre-selected torque limit.

3. The rotary power tool of claim 2, wherein the clutch includes an axially adjustable inner sleeve supporting the at least one biasing member and threadedly connected to the rotatable collar, wherein rotation of the collar results in axial motion of the inner sleeve, and wherein axial motion of the inner sleeve is configured to adjust the force applied by the at least one biasing member to the plurality of clutch elements.

4. The rotary power tool of claim 3, wherein the clutch includes a cage supporting the plurality of rolling elements, the cage having a plurality of circumferentially spaced pockets corresponding to each of the plurality of rolling elements for locating the rolling elements along the circumference of the cage.

5. The rotary power tool of claim 1, wherein each of the puck shaped clutch elements has a cylindrical shape defined by a length and a diameter, and wherein the length is less than the diameter.

6. The rotary power tool of claim 5, further comprising a lockout ring including a plurality of bores configured to support the plurality of puck shaped clutch elements.

7. The rotary power tool of claim 6, wherein the lockout ring is rotatable between a clutch configuration, in which the plurality of bores is axially aligned with the pins and the rolling elements, and a lockout configuration, in which the plurality of bores is misaligned with the pins and the rolling elements, and wherein, in the lockout configuration, the rolling elements cannot slip relative to the output of the transmission.

8. A rotary power tool comprising:
a housing; and
a drive mechanism disposed within the housing, the drive mechanism including
an electric motor,
a transmission operably coupled to the electric motor,
a spindle operably coupled to an output of the transmission, the spindle configured to transmit torque generated by the electric motor to a working tool bit, and
a clutch disposed between the output of the transmission and the spindle, the clutch including
a plurality of spherical rolling elements configured to engage the output of the transmission,
a plurality of cylindrical clutch elements, and
at least one biasing member configured to bias the cylindrical clutch elements towards the spherical rolling elements,
wherein each of the cylindrical clutch elements includes a length measured parallel to a rotational axis of the spindle and a diameter, and wherein the diameter is greater than the length.

9. The rotary power tool of claim 8, further comprising a lock out ring configured to support the cylindrical clutch elements, wherein the lock out ring is rotatable between a clutch configuration in which the cylindrical clutch elements are aligned with the spherical rolling elements and a lockout configuration in which the cylindrical clutch elements are misaligned with the spherical rolling elements.

10. The rotary power tool of claim 8, wherein the output of the transmission includes a plurality of detents configured to engage the plurality of spherical rolling elements, the plurality of detents configured to transmit torque from the transmission to the plurality of spherical rolling elements.

11. The rotary power tool of claim 10, wherein the plurality of spherical rolling elements is displaceable axially away from the plurality of detents when the torque from the electric motor exceeds a pre-selected torque limit.

12. The rotary power tool of claim 11, further comprising an adjustment mechanism including a rotatable outer collar configured to adjust the torque limit of the clutch, wherein rotation of the outer collar in a first direction increases the force from the at least one biasing member on the cylindrical clutch elements, and wherein increasing the force from the at least one biasing member on the cylindrical clutch elements increases the pre-selected torque limit.

13. A rotary power tool comprising:
a housing; and
a drive mechanism disposed within the housing, the drive mechanism including
an electric motor,
a transmission operably coupled to the electric motor,
a spindle operably coupled to an output of the transmission, the spindle configured to transmit torque generated by the electric motor to a working tool bit, and
a clutch disposed between the output of the transmission and the spindle and configured to selectively transfer torque from the output of the transmission to the spindle, the clutch including
a plurality of spherical rolling elements configured to engage the output of the transmission, the plurality of spherical rolling elements configured to slip relative to the output of the transmission when the torque from the transmission exceeds a selected torque limit,
a plurality of puck shaped clutch elements configured to be selectively aligned with the plurality of spherical rolling elements, the puck shaped clutch elements being larger in diameter than length,
at least one biasing member configured to bias the plurality of puck shaped clutch elements towards the spherical rolling elements,
an adjustment mechanism configured to vary the selected torque limit, and
a lockout ring rotatable between a clutch configuration, in which the clutch is operable to limit the torque transferred from the output of the transmission to the spindle, and a lock out configuration, in which the clutch does not limit the torque transferred to the spindle.

14. The rotary power tool of claim 13, wherein the adjustment mechanism includes an outer collar threadedly coupled to an inner sleeve, wherein rotation of the outer collar results in axial motion of the inner sleeve.

15. The rotary power tool of claim 14, wherein the inner sleeve supports the at least one biasing member.

16. The rotary power tool of claim 15, wherein rotation of the outer collar in a first direction causes the inner sleeve to compress the at least one biasing member, thereby increasing a preload of the at least one biasing member and the a force applied by the at least one biasing member on the plurality of puck shaped clutch elements, and wherein rotation of the outer collar in a second direction, opposite the first direction, causes the inner sleeve to reduce the preload of the at least one biasing member.

17. The rotary power tool of claim 13, wherein the lockout ring includes a plurality of circumferentially spaced bores configured to accommodate the plurality of puck shaped clutch elements.

18. The rotary power tool of claim 17, wherein, when the lockout ring is in the clutch configuration, the plurality of puck shaped clutch elements is aligned with the plurality of spherical rolling elements to transmit a force generated by the at least one biasing member to the plurality of spherical rolling elements and bias the spherical rolling elements into engagement with the output of the transmission.

19. The rotary power tool of claim 18, wherein, when the lockout ring is in the clutch configuration, the plurality of spherical rolling elements is displaceable against the force generated by the at least one biasing member.

20. The rotary power tool of claim 19, wherein, when the lockout ring is in the lock out configuration, the plurality of puck shaped clutch elements is misaligned with the plurality of spherical rolling elements and the plurality of spherical rolling elements are not displaceable.

* * * * *